2,922,822
Patented Jan. 26, 1960

2,922,822
PRODUCTION OF METHYL BUTENYL ETHERS

Leland K. Beach, Westfield, N.J., assignor to Esso Research and Engineering Company, a corporation of Delaware No Drawing. Application January 8, 1957
Serial No. 632,979

13 Claims. (Cl. 260—614)

This invention relates to novel alkenyl ethers and their preparation by a process wherein an alcohol and a diolefin are reacted in presence of an active acid catalyst. One particular embodiment relates to a process wherein methyl alcohol and butadiene are reacted to produce methyl butenyl ethers. Still more particularly, the invention relates to such reactions wherein a strongly acidic synthetic ion-exchange resin such as a sulfonated resinous copolymer of styrene and divinyl benzene is the active catalyst.

The production of ethers, both simple and mixed, saturated and unsaturated, from alcohols is well known. The production of mixed aliphatic ethers by reaction of primary and secondary alcohols with iso-olefins is also old. However, this type of reaction has not been successfully applied to the reaction of alcohols with diolefins, or even to alcohols with normal olefins.

It is the main object of this invention to provide a process for producing mixed unsaturated ethers by the reaction of aliphatic alcohols with butadiene or other diolefins in the presence of an active acid catalyst. It is a further object to disclose a solid catalyst suitable to serve as the active catalyst in such a reaction. Still further objects will become apparent as the details of the invention are described hereinafter.

It has now been discovered that $C_4$–$C_{12}$ and preferably conjugated $C_4$–$C_6$ diolefins, such as 1,3-butadiene, cyclopentadiene, isoprene, methyl cyclopentadiene, etc., can be reacted with $C_1$ to $C_8$ alcohols, preferably primary aliphatic monohydric alcohols, such as methanol, ethanol, octyl alcohol, and others in an effective manner with the aid of certain acidic ion-exchange resins, notably certain synthetic cation-exchange resins in their acid form which contain sulfonic, or phosphonic acid groups, to give appreciable yields of the corresponding ethers. The products, especially the methyl butenyl ethers, the mono-methyl ethers derived from isoprene, and the cyclopentenyl-methyl ethers, have many profitable uses, such as conversion to ketones, as gasoline blending components or as solvents.

The ion-exchange resins suitable as catalysts in the present invention include those which may be generally defined as synthetic aryl resins possessing essentially a hydrocarbon skeleton combined with strong mineral acid groups. The molecular weight must be sufficiently high or the structure sufficiently cross-linked to provide a resin substantially insoluble in water or alcohols at temperatures up to about 350° F. The inorganic phosphoric-zirconium acid exchangers are another more stable, but slightly less active type. The following paragraphs summarize suitable methods of preparation and the principal characteristics of the preferred type of ion exchange resin. However, a more complete description of the various resins is given in Belgian Patent No. 542,654, the disclosure of which is hereby incorporated by reference in the present specification.

The organic based resins may be prepared by a variety of methods from a variety of raw materials. For example, the acid treatment, such as sulfonation, may be applied either to the monomer, such as styrene, which is then polymerized to give the ion-exchange resin, or preferably, the resin may be formed first followed by acid treatment of the solid resin.

The best catalysts for the purposes of the present invention are prepared by sulfonation of resinous copolymers of styrene containing a small amount of p-divinylbenzene. The sulfonated resin is particularly satisfactory with respect to catalytic activity and stability when resins containing 88–96 wt. percent of styrene and correspondingly 12–4 wt. percent of divinyl benzene are sulfonated in an otherwise known manner so as to give a product containing about 0.5 to 2 sulfonate radicals per aromatic ring. Instead of styrene, it is permissible to prepare the resin by polymerization of other monovinyl aromatic compounds such as p-methyl styrene, p-ethyl styrene, dimethyl styrenes, p-chlorostyrene, dichlorostyrenes, vinyl naphthalene, etc. Likewise, instead of divinyl benzene, other polyvinyl aryl compounds may be used such as divinyl toluene, divinyl ethyl benzene, divinyl chlorobenzene, and the like. These catalytically active sulfonated ion-exchange resins are available as commercial products. For instance, the Dow Chemical Company's "Dowex 50-X8" is a well known ion-exchange resin and is a particularly good one for the purposes of the present invention. This is a sulfonated copolymer of about 92 wt. percent styrene and 8 wt. percent divinyl benzene, and containing about one sulfonate radical per aromatic ring or about 12 to 16 wt. percent sulfur in the sulfonate form based on anhydrous resin; in its commercial form it usually contains about 44 to 50 wt. percent moisture. There are many other similar commercial ion-exchange resins suitable for the invention, such as the Rohm and Haas Company's "Amberlite" resins. All these resins are usually used in the form of granules ranging in size, for instance, between 20 and 200 mesh.

In order for the present reaction to occur advantageously, the reaction temperature is desirably maintained between 100° F. and 300° F., preferably 200° to 275° F., the pressure between 100 p.s.i.g. and 2000 p.s.i.g., preferably 800 to 1200 p.s.i.g., the alcohol-diolefin liquid volume ratio between 1:2 and 30:1 and the total liquid volumetric feed velocity between 0.1 v./v./hr. and 10 v./v./hr. For instance, suitable reaction conditions may include a temperature of 250° F., a pressure of 1000 p.s.i.g., an alcohol-diolefin liquid volume ratio of about 4/1, and 2.5 volumes of liquid feed per reactor volume per hour.

The product of the reaction of the alcohol with the diolefin very often consists of two or more isomeric monoethers, and, in certain instances discussed hereinafter, a diether is formed as well. In the case of butadiene the mono methyl ether isomers are easily separable as $CH_3OH$ azeotropes by distillation, and, if one is recycled to give an equilibrium mixture with the other and again separated, it is possible to produce predominantly one or the other isomer. In order to effect a satisfactory separation, the total product, comprising the product ethers and excess alcohol, may be subjected to fractional distillation, with or without additional alcohol, and alcohol fractions containing the isomers are distilled off, separated, washed with water or brine such as 20% NaCl to remove the alcohol, and dried over $CaCl_2$, $K_2CO_3$, or the like to substantially remove all the moisture.

The process of the present invention has also been found quite effective in applications other than the mere production of the unique ethers described above. Of especial interest is the use of the process to purify tertiary diolefins, such as isoprene and higher such compounds, and cyclodiolefins such as methyl cyclopentadiene, and methyl cyclohexadiene. In such a purification process the impure diolefin is reacted with an alcohol under the conditions cited above to form an ether product. In the case of the tertiary diolefins mentioned above, a distinctive diether is formed in addition to the expected monoindicated by analysis to be 3-methoxy butene-1 and trans-1-methoxy-butene-2. The properties of these two isomers as compared to methanol have been determined as follows:

|  | 3-Methoxy butene-1 | Trans-1-methoxy butene-2 | Methanol |
|---|---|---|---|
| Formula | $H_2C=\overset{H}{\underset{\underset{CH_3}{O}}{C}}-\overset{H}{C}-CH_3$ | $CH_3-\overset{H}{C}=\overset{H_2}{\underset{H}{C}}-OCH_3$ | $CH_3OH$ |
| Molecular weight | 86 | 86 | 32 |
| Boiling point (uncorr.) ° C | 56 | 80 | 65 |
| Density (d), at 20° C | 0.750 | 0.782 | 0.7928 |
| d at 37.5° C | 0.737 | 0.767 |  |
| Refractive index, $n_D^{20}$ | 1.3804 | 1.3991 | 1.3283 |
| Azeotrope: |  |  |  |
| Boiling point (uncorr.) ° C | 51 | 61 |  |
| Vol. percent methanol (approx.) | 19 | 46 |  |
| d at 20° C | 0.7655 | 0.789 |  |
| d at 37.5° C | 0.750 | 0.777 |  |
| Refractive index, $n_D^{20}$ | 1.3750 | 1.3675 |  | ether isomers. This diether boils at temperatures distinct from the monoethers formed from monoolefins, and is therefore easily separable by conventional distillation steps. The diether is then decomposed to the alcohol and the diolefin over a dehydration catalyst such as silica-alumina in a low pressure reactor at temperatures between 100° and 300° F. After washing and drying, the tertiary diolefin, or cyclodiolefin, can be recovered at purities up to 99.9%. The above purification process overcomes such disadvantages of previously known processes as corrosion problems, multiple separations, expensive reagents, and low purity. High purity tertiary diolefins and cyclodiolefins are in increasing demand for various chemical processes such as production of synthetic elastomers, e.g., high-purity isoprene is required in the recently developed manufacture of synthetic "natural" rubber.

Also, the process of the present invention may be used advantageously for the removal of butadiene from $C_4$ refinery cuts to improve such cuts for alkylation. In addition, when cheap refinery cuts containing diolefins are treated according to the present invention, the ether-containing products can be added to gasoline to improve its octane rating. For example, the methylbutenyl ethers and the diether from isoprene have been found to constitute particularly excellent anti-knock agents.

The following examples will further illustrate the nature of the present invention, but it should be understood that the invention is not limited thereto.

*Example I*

A mixture of methanol and butadiene-1,3 is passed over a sulfonated styrene-divinyl benzene copolymer resin (Dowex 50-X8) under the following batchwise reaction conditions:

| | |
|---|---|
| Methanol liquid feed rate, cc./hr | 1000 |
| Butadiene liquid feed rate, cc./hr | 250 |
| Dowex 50-X8 catalyst, cc | 500 |
| Temperature, ° F | 250 |
| Pressure, p.s.i.g. | 1000 |
| Total liquid volumetric feed velocity, v./v./hr | 2.5 |
| Butadiene conversion, mole percent | 31 |
| Conversion to higher boiling point ether isomer, mole percent | 18 |
| Conversion to lower boiling point ether isomer, mole percent | 12 |
| Conversion to other products, mole percent | 1 |

It should be noticed from the data that about 30% conversion of butadiene to methyl butenyl ether products was obtained by the new reaction with negligible formation of side products. This ether product, worked up as described hereinafter, was obtained in two isomeric forms, The total reaction products were fractionally distilled in a 35-plate Oldershaw column. The distillation curve showed two distinct plateaus, one at 51° C. and one at 61° C., corresponding to the boiling points of the azeotropic mixture of the respective ether isomer and methanol. The two fractions containing the azeotropic mixtures were then combined, and the mixture was repeatedly water-washed and dried over $CaCl_2$ and then $K_2CO_3$. This dried mixture was then fractionated at atmospheric pressure to give two cuts, one boiling at 56° C. (uncorr.) and one at 80° C. (uncorr.), which were essentially the separate anhydrous ethers. The data show that the ratio of conversion to the two isomers under these conditions was about 3 to 2, favoring the higher boiling 1-methoxybutene-2 isomer. When one isomer is more in demand than the other, the azeotrope of the undesired isomer may be recycled so that it may be equilibrated to maximize production of the desired isomer. Of course, the second fractionation step above was employed merely to determine the boiling points of the two isomers and is unnecessary in commercial operation.

*Example II*

A mixture of methanol and isoprene is passed over the same resin as in Example I under the following batchwise reaction conditions:

| | |
|---|---|
| Methanol liquid feed rate, cc./hr | 400 |
| Isoprene liquid feed rate, cc./hr | 100 |
| Resin catalyst, cc | 500 |
| Temperature, ° F | 225 |
| Pressure, p.s.i.g. | 1000 |
| Total liquid volumetric feed velocity, v./v./hr | 1.0 |
| Conversion to diether, wt. percent | 25 |
| Conversion to monoethers, wt. percent | 12 |

In this experiment, it was found that isoprene can be converted to both the mono methyl ethers and to a dimethyl ether. The conditions used above are well suited for conversion to the dimethyl ether. Other conditions tend to favor conversion to the monoethers. The properties of the diether cut, the formula for which may be written as $CH_3O.C_5H_{10}.OCH_3$, are: boiling point, 143° C.; density at 25° C.; 0.860; refractive index, $n_D^{20}=1.409$. Several isomers of the monoether are formed, one boiling between about 75° and 80° C., and one boiling between about 100° and 110° C. The monoether may be described by formula as $CH_3O.C_5H_9$.

In addition to the aforementioned uses of the products of the present invention, the monoether boiling between 100° and 110° C., derived from isoprene, is an excellent nitrocellulose solvent, having a toluene dilution ratio greater than 2. The diether derived from isoprene, as well as the monoethers from butadiene are especially attractive as gasoline components, also.

*Example III*

A portion of a $C_5$ fraction, derived by conventional steam-cracking of a heavy gas oil and containing both piperylene and isoprene, was fractionated to give a piperylene cut containing essentially no isoprene. Both the original $C_5$ fraction and the resulting piperylene cut were reacted in part with methanol under the reaction conditions of Example II. The original $C_5$ fraction, when so reacted, gave a product containing a distinctive diether cut boiling at about 143° C. as well as monoethers boiling up to about 110° C. and polymeric $C_{10}$ products boiling above 170° C., whereas the piperylene cut gave only the monoethers and the $C_{10}$ polymeric material. Therefore, since isoprene is the only $C_5$ hydrocarbon forming a diether upon reaction with methanol, isoprene is easily separable in very pure form from an impure $C_5$ fraction by intermediate diether formation.

Generally, the process for such a purification of isoprene is as follows. The impure fraction containing isoprene is fed to a distillation tower where low boiling material is removed overhead. Secondly, the bottoms, containing isoprene, is either fed directly to an ether-forming reaction zone where the bottoms are reacted with methanol in about a 1 to 1 volume ratio in presence of a solid acid catalyst at conditions of about 500 p.s.i.g., 200° F., and a liquid rate of about 2 v./v./hr., or distilled with a limited amount of methanol to produce an azeotrope containing isoprene which is then fed to such a reaction zone. Following the reaction the unreacted $C_5$ hydrocarbons are separated from the ether product by azeotropic distillation with methanol in presence of a basic compound, e.g., sodium bicarbonate. Then the ether product is distilled again under conditions which cause the methanol-containing monoethers of the $C_5$ unsaturates to be easily removed. The remaining diether cut is dried, separated by fractionation from higher boiling bottoms, and fed to an ether decomposition reactor. This reactor operates at low pressures, e.g., atmospheric pressure, and temperatures between 100° and 300° F. Silica-alumina is a typical catalyst for the decomposition, and the presence of water and excess methanol is sometimes beneficial. This pure isoprene product is washed and dried, and then either recovered directly or separated from unreacted diether by distillation. The purity of isoprene so recovered can be as high as 99.9%.

Having described the general nature and illustrative embodiments of the present invention, its true scope is now set forth in the appended claims.

I claim:

1. A process for making unsaturated ethers which comprises contacting a mixture of a saturated primary aliphatic monohydric $C_1$–$C_8$ alcohol and a $C_4$–$C_{12}$ conjugated diolefin in liquid phase with an acid ion-exchange resin comprising a sulfonated resinous copolymer of styrene and divinyl benzene at a temperature between 100° and 300° F. and a pressure between 100 and 2000 p.s.i.g.

2. A process according to claim 1 wherein the alcohol is methanol and the diolefin is butadiene-1,3.

3. A process according to claim 1 wherein the alcohol is methanol and the diolefin is isoprene.

4. A process for producing methyl butenyl ether which comprises contacting a mixture of methanol and butadiene-1,3 over a synthetic resinous sulfonated copolymer of about 84–96% styrene and correspondingly 16 to 4% divinyl benzene, and containing 0.5 to 2 sulfonic acid groups per aromatic ring, at a temperature of about 200° to 275° F. and a pressure of about 800 to 1200 p.s.i.g.

5. A process for producing methyl butenyl ether which comprises contacting a mixture of methanol and butadiene-1,3 at a temperature of about 200° to 275° F. and a pressure of about 800 to 1200 p.s.i.g. in the presence of a synthetic resinous copolymer of about 88 to 96 wt. percent styrene and correspondingly 12 to 4 wt. percent divinyl benzene, fractionally distilling the total product, recovering two distinct azeotropic methanol fractions, and removing the methanol from each fraction, and separately recovering two distinct isomers of methyl butenyl ether.

6. A process according to claim 5 where one of the ether isomer containing azeotropic fractions is recycled to give an equilibrium mixture with the reactants, thereby producing predominantly the other isomer.

7. A process for producing monomethyl and dimethyl ethers of isoprene which comprises contacting a mixture of methanol and isoprene over a synthetic resinous sulfonated copolymer of about 88 to 96 wt. percent styrene and correspondingly 12 to 4 wt. percent divinyl benzene at a temperature of about 200° to 275° F. and a pressure of about 800 to 1200 p.s.i.g., fractionally distilling the total product, recovering the methanol azeotropes of the mono-methyl ether boiling between about 167° and 176° F. and between about 212° and 230° F. and the methanol azeotrope of the dimethyl ether boiling at about 290° F., and removing the methanol from each azeotrope.

8. A process according to claim 7 wherein the methanol azeotropes of the monomethyl ether are recycled to give an equilibrium mixture with the reactants, thereby producing predominately the dimethyl ether.

9. A process for making alkyl butenyl ethers, which comprises reacting a saturated primary aliphatic monohydric $C_1$ to $C_8$ alcohol with butadiene-1,3 in the presence of a sulfonated styrene-divinyl benzene copolymer resin which is an acid ion-exchange resin at a temperature between 100° and 300° F. and a pressure of about 800 to 1200 p.s.i.g., the alcohol to butadiene liquid volume ratio being in the range of between 1:2 and 30:1, and subsequently recovering alkyl n-butenyl ether isomers from the resulting reaction products.

10. The process defined in claim 9, wherein the alcohol is methanol, and the resulting reaction products are fractionated to recover trans-1-methoxy butene-2 and 3-methoxy butene-1 as separate products.

11. The process defined in claim 9, wherein the alcohol is methanol, the liquid feed rate of methanol to butadiene is about 4:1, the temperature of reaction is about 250° F., the pressure is about 1000 p.s.i.g. and the total liquid feed rate is about 2.5 volumes per volume of catalyst per hour to favor higher yields of the trans-1-methoxy butene-2.

12. A process for the purification of isoprene which comprises contacting an isoprene-containing $C_5$ hydrocarbon fraction with methanol at a temperature between 200° and 275° F. and a pressure between 800 and 1200 p.s.i.g. in the presence of a sulfonated resinous copolymer of styrene and divinyl benzene, separating by distillation the unreacted $C_5$ material and the monoethers of the $C_5$ unsaturates from the diether derived from isoprene, decomposing said diether at low pressures and temperatures between 100° and 300° F., and recovering the resulting high purity isoprene.

13. A process for the purification of isoprene which comprises distilling an isoprene-containing steam-cracked $C_5$ hydrocarbon fraction to remove low-boiling material overhead, contacting the isoprene-containing bottoms with liquid methanol, at a temperature between 200° and 275° F. and a pressure between 800 and 1200 p.s.i.g. over a synthetic resinous sulfonated copolymer of about 88 to 96 wt. percent styrene and 12 to 4 wt. percent divinyl benzene, azeotropically distilling the ether product with methanol in presence of sodium bicarbonate to remove the unreacted $C_5$ material overhead, distilling the bottoms to remove the methanol-containing monoethers of the $C_5$ hydrocarbon unsaturates from the diether of isoprene, drying and separating said diether from higher boiling impurities by distillation, decomposing the pure diether at a temperature between 100° and 300° F. in presence of a silica-alumina catalyst, and washing, drying, and recovering high purity isoprene.

References Cited in the file of this patent

UNITED STATES PATENTS

| | | |
|---|---|---|
| 2,042,219 | Groll et al. | May 26, 1936 |
| 2,122,812 | Groll et al. | July 5, 1938 |
| 2,241,421 | Price et al. | May 13, 1941 |
| 2,480,940 | Leum et al. | Sept. 6, 1949 |
| 2,752,406 | Seyfried | June 26, 1956 |

OTHER REFERENCES

Karrer: Organic Chemistry (1950), pp. 58 and 59.
Weissberger: Technique of Organic Chemistry (1951), vol. IV, p. 225.
Waters et al.: Jour. Amer. Chem. Soc., vol. 76 (1954), p. 711.
Royals: Advanced Organic Chemistry (1956), p. 396.